United States Patent [19]

Sauer et al.

[11] 4,115,626
[45] Sep. 19, 1978

[54] AIR/ZINC FLAT CELL

[75] Inventors: Hans Sauer, Idstein-Walsdorf; Dieter Spahrbier, Fischbach, Taunus, both of Fed. Rep. of Germany

[73] Assignee: Varta Batterie Aktiengesellschaft, Fed. Rep. of Germany

[21] Appl. No.: 780,435

[22] Filed: Mar. 23, 1977

[30] Foreign Application Priority Data

Apr. 10, 1976 [DE] Fed. Rep. of Germany ....... 2615921

[51] Int. Cl.² ............................................. H01M 8/22
[52] U.S. Cl. .................................................. 429/27
[58] Field of Search ...................... 429/12, 17, 19, 42, 429/34, 35, 36, 37, 38, 39, 27

[56] References Cited

U.S. PATENT DOCUMENTS

| 1,899,615 | 2/1933 | Heise | 429/27 |
| 3,741,810 | 6/1973 | Dafler et al. | 429/38 |

Primary Examiner—John H. Mack
Assistant Examiner—H. A. Feeley
Attorney, Agent, or Firm—Weiser, Stapler & Spivak

[57] ABSTRACT

Perforated plastic half shells enclose series of components, each including a conductive foil, a take-off conductor, the positive pressed carbon electrode, and separator. Between these components there is the negative zinc plate electrode, which is framed in plastic. The half shells have electrolyte access passages and connector lead-throughs.

9 Claims, 1 Drawing Figure

U.S. Patent
Sept. 19, 1978
4,115,626
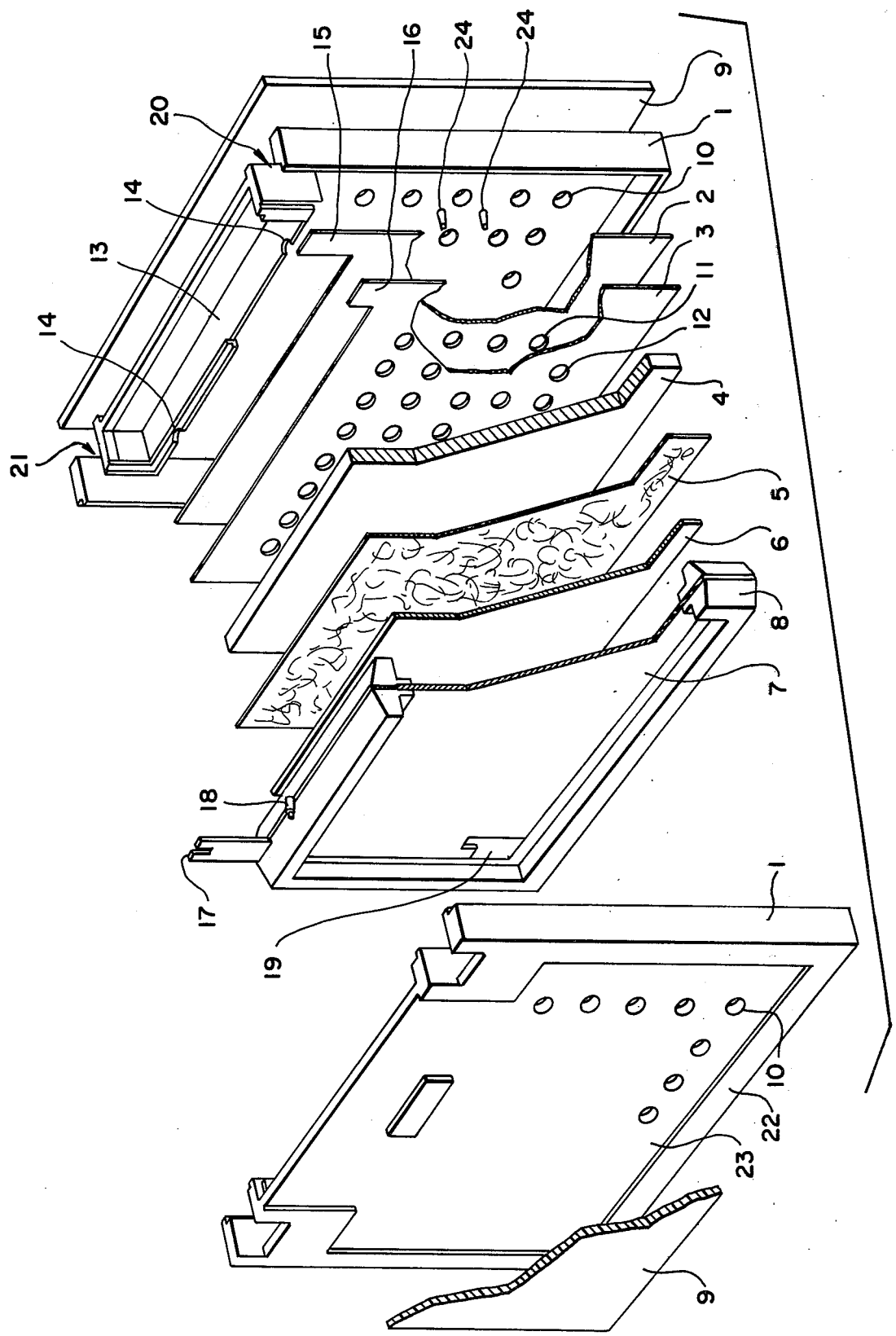

AIR/ZINC FLAT CELL

The invention relates to an air/zinc element with a plate-like negative zinc electrode positioned between two positive air electrodes and disposed within a synthetic plastic housing.

For many purposes, such as for illuminating devices independent of power lines which are used in railroad operations, it is advantageous to use as energy sources electrochemical systems which are as rugged as possible. Among these are air/metal elements using iron or zinc, for example, as the negative electrode, and a depolarizer for the ambient oxygen as the positive electrode. Such a system is particularly suitable when costs and maintenance requirements must be kept within narrow limits, when the light source is in an exposed position subject to temperature extremes, and when a long operating life is desired for the installation.

In those oxygen-zinc elements which are suitable for this purpose and which have long been known, a negative zinc electrode faces a porous carbon body constituting the positive oxygen electrode. Its principal constituent is activated carbon, by which the ambient oxygen is catalytically reduced. Additives of graphite and carbon black to the carbon body have the purpose of enhancing the electrical conductivity of the electrode. The hdyrophobic carbon black also impedes penetration of the electrolyte into the pressed body, and thereby facilitates diffusion of the oxygen into the electrodes.

As electrolyte, there may be used ammonium chloride, as known from maganese dioxide elements with an additive of zinc chloride. It is also advantageous to utilize neutral manganese (II) chloride, which forms concentrated solutions having a vapor pressure of about 60%. This corresponds approximately to the humidity encountered in nature and thereby counteracts a shortcoming of ambient oxygen elements having ammonium chloride electrolytes, which have a tendency to transfer water to the atmosphere and thereby to dry out.

A distinction based on structure is made between round or cylindrical cells and plate cells. The former correspond to the construction of the manganese dioxide cells, having a zinc container as the negative electrode and a central carbon rod as the positive electrode, around which there is compressed the activated carbon with additives and finally the electrolyte.

From the standpoint of good oxygen diffusion and good ion conductivity within the positive electrode, the structural principles of plate cells provide greater advantages, if only because of the greater electrode cross-section and the short diffusion paths. However, the manufacture of plate cells entails greater difficulties than that of cylindrical cells.

German Pat. No. 1,187,696, which corresponds to U.S. Pat. No. 3,279,948, teaches a positive electrode for plate-like ambient oxygen elements. This electrode encloses with its gas permeable conductive layer an air filled space of horseshoe-shaped configuration. The depolarizer mass for the oxygen reduction is pressed onto the sides of the conductive layer facing away from the air pocket. By insertion into a pocket-shaped zinc container, this electrode is made into a complete element.

German patent publication (Offenlegungsschrift No. 1,596,168 discloses a structural principle which is the inverse of the above, in that the negative electrode may be inserted in drawer-like fashion into the air cathode, which is in the form of a pocket.

Both arrangements suffer from the drawback that the positive and negative electrodes respectively constitute separate components, and a finished element is created only by combination of both of these constituents. The further connection of such elements into a battery also involves disadvantages because this must be accomplished electrode electrode with the aid of matching holders and a frame for clamping these together, or because the completely interconnected cell block exhibits too much dead space due to superfluous housing walls and other material which does not contribute to the electrochemical processes.

Accordingly, it is an object of the present invention to provide a structure, based on the principle of the plate cell, which unites the positive and negative electrodes in a compact cell.

It is another object to provide such a cell which provides a convenient building block for ambient oxgyen batteries having uncomplicated interconnection capabilities.

It is another object to provide such a novel construction which is better suited to manufacturing techniques.

These and other objects which will appear are accomplished in accordance with the invention as follows.

The air/zinc element is made of two half shells with perforated outer walls. In each of these there is positioned a conductive foil and a take-off conductor, as well as the positive electrode pressed body. The two half shells are connected to each other with interposition of separator and of the negative plate-like zinc electrode, which is provided at its rim with a synthetic plastic frame. The half shells are provided with apertures for electrolyte introduction and for the passage of take-off conductors.

Another desirable characteristic of the invention resides in that the upper rim of the half shells is provided with a tub-shaped recess containing apertures for electrolyte passage. This recess extends along a portion of the length of the half shells, while leaving free a space for the passage of the take-off conductor.

For further details, reference is made to the discussion which follows in the light of the accompanying drawing wherein the single figure shows an exploded view of the series of component elements of a cell embodying the invention with portions of some of these elements cut away.

BRIEF DESCRIPTION OF DRAWINGS

Referring to the drawing, this shows the layered structure of the cell and the sequence of the individual elements thereof at right angles to the electrode surface. In view of its symmetrical construction, only half the cell is illustrated in the drawing.

DETAILED DESCRIPTION OF DRAWINGS

The inner surface of half shell 1 first has applied to it the positive take-off conductor 2, which is of thin lead foil. Conductive foil 3 is adhesively attached to conductor 2. In so doing, the aligned perforations 11 and 12 of the take-off conductor and of the conductive foil, respectively, are so placed relative to the somewhat smaller air holes 10 of the half shell 1 that the corrodable lead (Pb) of the conductor is nowhere exposed. Of the two vanes 16 and 15 of the conductive foil and of the positive take-off conductor, respectively, the latter, which is the longer, terminates in hollow 20 for the take-off conductor passage of the positive electrode. There it is joined to its mating element (not shown).

Upon the conductive foil there is then pressed the carbon body 4 of the positive electrode. After interposition of separator 5, the synthetic plastic frame 8 with negative electrode 7 is fitted into the half shell 1. In so doing, the protruding portions of the synthetic plastic frame extend over the carbon body 4. Supplemental anchoring of the carbon mass deep inside half shell 1 is provided by pins 24.

Hollow 21, which provides a passage for the take-off conductor of the negative electrode, contains vane 17 of the zinc sheet.

A cut-out 19 in the zinc electrode is the result of waste free stamping out of the zinc sheets including the vanes.

Because the outer surface 23 of half shell 1 is somewhat recessed relative to its rim 22 there is created an air gap between this outer surface and the cover plate 9 when the latter is adhesively attached. This gap extends over the entire recess, that is practically over the cross-section of the electrode. By means of recesses at the lower rim, this air gap can also provide a continuous vertical opening, producing a chimney effect which may be desirable in certain circumstances.

The electrolyte is introduced through openings 14 in the tub-shaped recess 13 in half shell 1 which extends into apertures 18 in synthetic plastic frame 8. In the cell half illustrated it essentially fills chamber 6. Through cut-out 19, it is in direct communication with the electrolyte on the opposite side of the negative electrode.

It will be understood that, between negative zinc electrode 7 and the other half shell 1 shown at the left-hand end of the drawing, there is another series of components corresponding to those shown between the negative zinc electrode 7 and the half shell 1 at the right-hand end of the figure.

The advantages accruing from the invention arise, among other reasons, from the fact that such air/zinc elements can be interconnected like building blocks, close together and without unnecessary housing partitions, into cell blocks of any desired dimensions, and can be connected with each other by means of any desired connector arrangements. Even with closest contact within a cell assembly, the ambient oxygen has unimpeded access to the positive electrode of the carbon body. This is because the recessed outer walls of the half shell always provide, between two adjoining cells, air gaps along the full length of the electrode cross-section. The previously mentioned chimney effect, which is obtained by providing an air gap by a flow-through opening at the bottom, in order to facilitate the oxygen diffusion, further emphasizes this advantage of the arrangement. The electrode take-off conductors of both polarities may contact any desired connectors and the contact points may be protectively embedded in a potting or sealing compound or bitumen. As a result, the connection can always be optimally adapted to the practical circumstances.

Particularly for the zinc electrode there is the advantage that its connection takes place outside the electrolyte space, preventing the risk of corrosion.

The advantageous use of sealing or potting technique for the protection of the take-off conductor contacts is made possible by tub-shaped recesses in the upper rim of the housing half shells. Each of these is further provided with a small indentation for receiving the take-off vane, which can be filled with sealing or potting compound.

By means of the tub-shaped recess, which is in communication with the electrolyte chamber via two electrolyte supply ducts, the cell can subsequently be filled up.

On the other hand, water which forms in the course of the discharge or which reaches the cell interior from outside, can expand into the tub-shaped recess. The depth to which it fills this provides an approximate indication of the prevailing state of charge.

Further advantages of the invention lie in the arrangement of the zinc sheet between the two positive electrodes. By so doing, it is loaded on both sides, i.e. with a heavier discharge current, and can be better utilized electrochemically. On the other hand, a channel-shaped frame of synthetic plastic which encircles the zinc electrode largely protects the electrode rim from anodic dissolution and also ensures that it reamins intact as metallic electron take-off conductor up to the end of discharge.

The zinc sheet itself can be stamped out together with its vane without waste of material from a continuous strip, provided one accepts a cut-out in the sheet equal in configuration to the vane. However, in the cell embodying the invention this cut-out is used to advantage because, as also appears from the drawing, it connects the electrolyte spaces on both sides of the zinc electrode.

The carbon bodies of the positive electrode, by virtue of their fixation in the half shells, are particularly protected during subsequent processing into a cell. They can further be anchored by pins all the way into the depth of the pressed body within the half shell.

We claim:

1. An air/zinc element having a plate-shaped negative zinc electrode positioned between two positive air electrodes positioned in a synthetic plastic housing and comprising
    two half shells having rims and perforated outer walls, each half shell having a portion of its rim protruding outwardly beyond its perforated wall so as to space the perforations from adjoining objects,
    a conductive foil, take-off conductor, and positive electrode pressed body being positioned in each half shell, and
    the half shells being joined to each other, forming a synthetic plastic housing with interposition of separators and of the negative plate-shaped zinc electrode which has a synthetic plastic frame around its rim, said frame having shoulders to accomodate said separators providing an electrolyte space between said separators and said zinc electrode,
    the half shells being provided with electrolyte supply apertures and take-off conductor lead-throughs.

2. The element of claim 1 wherein
    the upper rim of the half shell is provided with a tub-shaped recess within which are positioned the apertures for electrolyte passage, the recess extending along only a portion of the length of the half shell while leaving space along the remaining length for the take-off conductor lead-throughs.

3. The element of claim 1 wherein
    a perforated lead foil is positioned between the inner surface of each half shell and the adjacent conductive foil, the perforations in the lead foil being larger than those of the perforated outer wall.

4. The element of claim 1 wherein
the synthetic plastic frame of the negative electrode extends over the edge of the carbon body of the positive electrode.

5. The element of claim 1 wherein
the electrode take-off conductors have contacts which are embedded in a sealed body.

6. The element of claim 1 wherein
the mass of the carbon body of each positive electrode is additionally anchored within the half shell by means of pins.

7. The element of claim 1 wherein the half shell has no protruding rim along at least a portion of the upper edge of the wall, whereby there is formed a gap for the admission of air to the perforated wall, even when another object adjoins the rim.

8. The element of claim 7 wherein the lower edge of the protruding rim also has recesses, creating with the non-protruding portion at the upper edge a chimney effect for air circulation.

9. The element of claim 1 wherein the zinc electrode has a cut-out for communication of electrolyte between opposite sides thereof.

* * * * *